No. 625,619. Patented May 23, 1899.
C. D. WALKER.
BICYCLE PEDAL.
(Application filed July 5, 1898.)
(No Model.)

WITNESSES:
Paul Jobet
John Lotka

INVENTOR.
C. D. Walker
BY
ATTORNEYS.

UNITED STATES PATENT OFFICE.

CHARLES D. WALKER, OF HONOLULU, HAWAII.

BICYCLE-PEDAL.

SPECIFICATION forming part of Letters Patent No. 625,619, dated May 23, 1899.

Application filed July 5, 1898. Serial No. 685,142. (No model.)

*To all whom it may concern:*

Be it known that I, CHARLES D. WALKER, of Honolulu, Hawaii, have invented certain new and useful Improvements in Bicycle-Pedals, of which the following is a full, clear, and exact description.

My invention relates to a pedal particularly applicable to bicycles and other foot-propelled vehicles, and has for its object to provide a pedal of simple construction which will give the rider a secure foothold, which will reduce the strain on the pedal ball-bearings, and which will facilitate ankle motion.

The invention will be fully described hereinafter and its novel features pointed out in the appended claim.

Reference is to be had to the accompanying drawings, forming a part of this specification, in which similar characters of reference indicate corresponding parts in all the figures.

Figure 1:
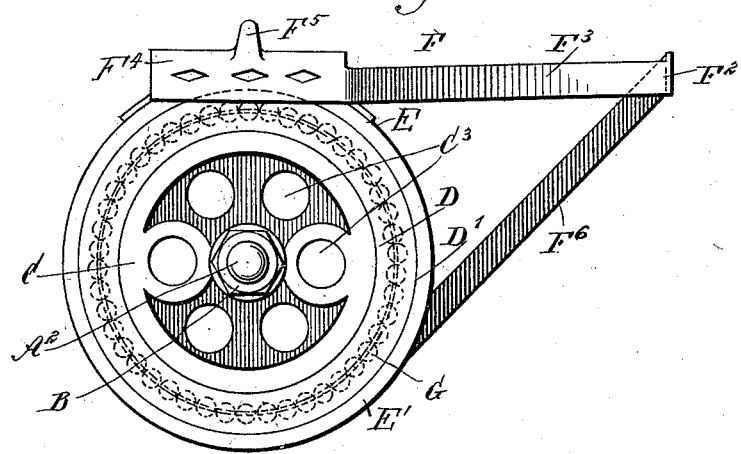
Figure 2:
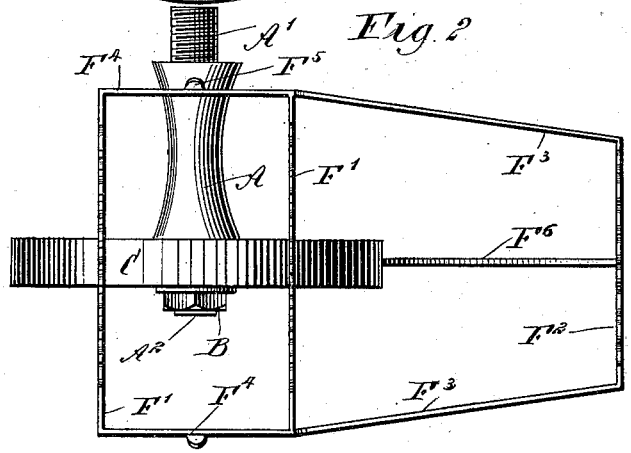
Figure 3:
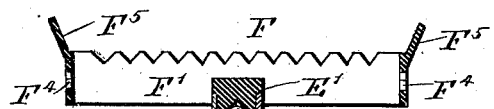

Figure 1 is a side elevation of the improved pedal. Fig. 2 is a plan thereof, and Fig. 3 is a transverse sectional elevation.

The pedal comprises the following parts: A is a pin or bolt adapted to be secured to the end of the crank in any suitable manner—for instance, by screwing the threaded end A' into the crank. The outer end $A^2$ is also screw-threaded to receive a nut B, which serves to hold rigidly on the pin A a disk C, which may be recessed and provided with perforations $C^3$, as shown, so as to make it light and of an ornamental appearance. The disk C at its inner surface—that is, the surface facing the crank—has an annular flange C', and approximately in its central plane, the disk has an inclined shoulder $C^2$, forming a ball-race. The flange C' is farther away from the center—that is, from the axis of the pin A—than the ball-race $C^2$. At the outer end, and still nearer the center, the disk C is screw-threaded concentrically with the pin A to receive a ring or collar D, having a flange D', corresponding in shape and location to the flange C', and a ball-race $D^2$, corresponding to the ball-race $C^2$. It will be understood that so far as described all the parts are rigidly connected to the crank to turn therewith. An annular series of balls G is adapted to run on the ball-races $C^2 D^2$ and to engage a ball-race $E^2$ on a pedal-ring E, adapted to be received between the flanges C' D' and having at its outer portion projections E', adapted to lie flush with the flanges C' D'. The construction is thus very neat and simple.

The pedal-ring E acts as a carrier for the foot-support F. Said support comprises a frame having two transverse bars F', secured at their central portions to the ring E and serrated or lined with rubber on their upper surfaces. A third transverse bar $F^2$, somewhat shorter than the bars F', is located at the rear or heel end of the foot-support and is held in position by forwardly-diverging bars $F^3$, connected to the rearward bar F', and by a central inclined brace $F^6$, whose lower end is secured to the pedal-ring E. The transverse bar $F^2$ may also be serrated on its upper surface. The outer ends of the transverse bars F' are connected by longitudinal bars $F^4$, which are provided approximately at their centers with upwardly-diverging foot-clamps $F^5$.

In operation as the pedal moves downward, the rider's foot has a natural tendency to incline the foot-support F so that the rear end thereof will be lower than the front end, and this tendency is increased owing to the unsymmetrical arrangement of the foot-support relatively to the pin A, it being observed that the greater portion of the support is in the rear of said pin. Owing to this arrangement the vertical line passing through the center of pressure will always be in the rear of the pin A—that is, in the rear of the connection to the crank.

A secure foothold is obtained by the provision of the three cross-bar F' $F^2$ and the side clamps $F^5$. The rear bar $F^2$ by projecting upward beyond the diverging side bars $F^3$ forms a stop to prevent the foot from slipping backward.

It will be seen that by simply unscrewing the collar D access may be had to the balls G, and the pedal-ring, with the foot-support, as well as the balls, may be readily removed. As the diameter of the ball-bearing races is comparatively large, the pressure upon the individual balls is reduced. The location of the ball-races in the central longitudinal plane of the foot-support minimizes lateral strains.

Having thus described my invention, I claim as new and desire to secure by Letters Patent—

A pedal having a disk-like central part of comparatively large diameter adapted for rigid attachment to a crank, a pedal-ring loosely mounted upon said central part, a foot-support carried by said pedal-ring and consisting of a rectangular front section secured directly to the upper portion of said ring, and having upwardly-diverging clamps at the centers of its sides, a rear section comprising rearwardly-converging side bars whose front ends are contiguous to the rear ends of the sides of the front section, a rear cross-bar connecting the rear ends of the said converging side bars and an inclined brace whose upper rear end is secured to the center of said cross-bar, while the front, lower end of the brace is secured to the lower portion of the pedal-ring, substantially as described.

CHARLES D. WALKER.

Witnesses:
H. E. WALKER,
JOHN B. DIAS.